(12) United States Patent
Nellissen et al.

(10) Patent No.: US 6,337,790 B1
(45) Date of Patent: Jan. 8, 2002

(54) THIN-FILM CAPACITOR

(75) Inventors: Antonius J. M. Nellissen, Eindhoven; Paul Van Oppen, Roermond, both of (NL); Hans P. Lobl, Monschau-Imgenbroich; Mareike K. Klee, Hückelhoven-Randerath, both of (DE); Wilhelm A. Groen, Limbricht; Nicolaas J. A. Van Veen, Eindhoven, both of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/385,279

(22) Filed: Aug. 30, 1999

(30) Foreign Application Priority Data

Sep. 2, 1998 (EP) .............................. 98202926
Dec. 14, 1998 (EP) .............................. 98204217

(51) Int. Cl.$^7$ .............................. H01G 4/228
(52) U.S. Cl. .............. 361/306.1; 361/308.1; 361/310; 361/321.4; 361/303; 361/305
(58) Field of Search .................. 361/306.1, 308.1, 361/310, 321.4, 303, 305, 535, 320, 312, 306.2

(56) References Cited

U.S. PATENT DOCUMENTS

| 4,453,199 A | | 6/1984 | Ritchie et al. ............... 361/306 |
| 4,931,961 A | * | 6/1990 | Ando et al. ................... 361/535 |
| 5,561,586 A | * | 10/1996 | Tomohiro et al. ............ 361/303 |
| 5,877,934 A | * | 3/1999 | Sano et al. ................... 361/312 |
| 6,023,408 A | * | 2/2000 | Schaper ..................... 361/306.2 |
| 6,125,027 A | * | 9/2000 | Klee et al. ................... 361/320 |
| 6,150,684 A | * | 11/2000 | Sone .......................... 257/295 |
| 6,201,682 B1 | * | 3/2001 | Mooji et al. .............. 361/306.1 |
| 6,212,057 B1 | * | 4/2001 | Kohara et al. ............ 361/301.4 |
| 6,226,170 B1 | * | 5/2001 | Nellissen et al. ......... 361/306.1 |
| 6,259,149 B1 | * | 7/2001 | Burkhardt et al. ........... 257/534 |
| 6,266,227 B1 | * | 7/2001 | Konushi et al. .......... 361/306.1 |

* cited by examiner

Primary Examiner—Dean A. Reichard
Assistant Examiner—Nguyen T Ha
(74) Attorney, Agent, or Firm—Norman N. Spain

(57) ABSTRACT

The present invention provides a new type of thin-film capacitor which is insensitive to breakdown voltages during its mounting on a printed circuit board. Said capacitor has an insulating substrate having at least two internal electrode layers which are mutually separated by means of a dielectric layer. The substrate also has two end contacts each of which are electroconductively connected to one of said internal electrode layers. According to the invention, the capacitor also has breakable electrically conductive means, preferably formed as a metal layer, which means are electrically connected to said end contacts. The presence of said breakable electrically conductive means between said end contacts prevents damage due to electrical storage which can arise during the mounting of the capacitor on a printed circuit board.

8 Claims, 1 Drawing Sheet

THIN-FILM CAPACITOR

Figure 1:
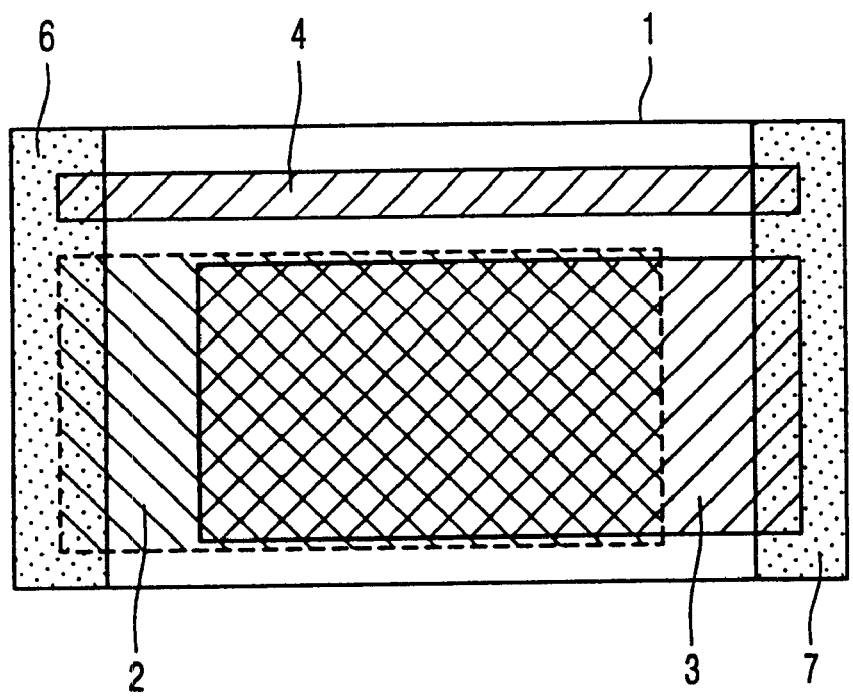

The invention relates to a thin-film capacitor comprising an insulating substrate which is provided with at least two inner electrode layers which are separated from each other by means of a dielectric layer, the substrate being also provided with two end contacts each electroconductively contacting one of the inner electrode layers.

A thin-film capacitor of the type mentioned in the opening paragraph is known per se, for example, from U.S. Pat. No. 4,453,199. More particularly, said patent describes a thin-film capacitor which is provided with an insulating substrate which is preferably made of glass. By means of thin-film techniques, said substrate is successively provided with a sub-layer of phosphor-doped silicon dioxide, a first inner electrode layer of aluminium, a dielectric layer of silicon dioxide, a second inner electrode layer of aluminium and an overlayer of silicon dioxide. The known capacitor is further provided with two sputtered end contacts. Via one of its ends, each inner electrode electrically contacts one of the end contacts of the capacitor.

It has been found that the known thin-film capacitor has a major drawback. It has been found that when mounting such a thin-film capacitor on a printed circuit board, breakdown may occur due to accumulation of electric charge. This phenomenon is known as electrostatic discharge (ESD). This problem notably occurs in capacitors having a comparatively small thickness of the dielectric layer. This drawback is particularly a problem when the capacitor is mounted in areas in which large electric charges can easily build up. The current trend of using capacitors with an ever-decreasing thickness of the dielectric layer, for example to values of 100 nm and less, leads to said problem becoming more and more pressing.

It is to be noted that said ESD problem does not occur in thick-film capacitors and in ceramic multilayer capacitors, because they have a relatively thick dielectric layer.

It is an object of the invention to alleviate this drawback. More particularly, it is an object of the invention to provide a thin-film capacitor in which the occurrence of breakdown due to build-up of electric charge during mounting is reduced considerably.

These and other objects of the invention are achieved with a thin-film capacitor comprising an insulating substrate which is provided with at least two inner electrode layers which are separated from each other by means of a dielectric layer, and with two end contacts each electroconductively contacting one of the two inner electrode layers, which capacitor according to the invention is characterized in that the capacitor is also provided with breakable electrically conducting connection means which connect both end contacts electrically.

By using said measure, the problem described above is strongly alleviated. The presence of breakable electrically conducting connection means between the end contacts prevents damage to the capacitor caused by electric charge when mounting the capacitor on a printed circuit board. By using the construction according to the invention, such a charge is directly neutralized via the electrically conducting connection means. After fixing the capacitor on the printed circuit board, the electrically conducting connection means can be removed, for example by means of a laser operation or by applying a controlled burst of current. This interrupts the electrically conducting contact between the end contacts.

A preferred embodiment of the film-film capacitor according to the invention is characterized in that the breakable electrically conducting connection means comprise a metal layer. Due to its high electrical conductivity, such a metal layer may immediately deplete possibly occurring charge of the capacitor described.

A further favorable embodiment of the capacitor according to the invention is characterized in that the metal layer forms part of an electrode layer. This embodiment provides major advantages in the mass manufacture of the thin-film capacitor. In this case, an extra process step of providing the metal layer is not necessary, but this layer can be provided simultaneously with the electrode layer to which it is connected. It is to be noted that it is, in principle, possible to provide the metal layer, possibly in a separate process step, as a separate layer in addition to the electrode layers.

An advantageous embodiment of the thin-film capacitor according to the invention is characterized in that the metal layer consists substantially of aluminium. Practice has proved that a metal layer of substantially aluminium can be interrupted in a simple way by using a laser operation.

Another interesting embodiment of the thin-film capacitor according to the invention is characterized in that the metal layer consists substantially of a metal which dissolves in solder. This has the important advantage that the metal layer is interrupted during soldering the capacitor on a PCB. As a result, a separate step of interrupting this layer is no longer necessary. Suitable metals for such a layer are Au and particularly Ag.

Another favorable embodiment of the thin-film capacitor according to the invention is characterized in that the electrically conducting connection means comprise a layer of electrically conducting metal compounds which, under the influence of a thermal treatment, are converted into non-conducting metal compounds. In principle, the thermal treatment may take place with the aid of a laser. However, when the capacitors are provided by means of the so-called reflow soldering technique, said conversion takes place simultaneously when soldering the capacitors on a PCB. In that case, a separate thermal treatment is no longer necessary. The class of electrically conducting metal (oxy)nitrides has been found to be very suitable for use in this embodiment. Under the influence of heat, these compounds are converted into the corresponding metal oxides which are electrically non-conducting. Interesting examples are TiN, TaN, $TiO_xN_y$ and $TaO_xN_y$, in which $0<x<1$, $0<y<1$ and $x+y=1$).

A further embodiment of the thin-film capacitor according to the invention is characterized in that the electrically conducting connection means comprise a layer of a low melting point metal alloy having a high surface tension. When soldering the capacitor on a PCB, the metal alloy melts. Due to the high surface tension, there will be coagulation so that the layer becomes electrically non-conducting. Suitable metal alloys for this embodiment are $Pb_xSn_y$, $Sn_xBi_y$, $Sn_xAg_y$, $Sn_xCu_y$, $Ag_xSb_y$ and $Sn_xZn_y$ (in which $0<x<1$, $0<y<1$ and $x+y=1$).

A further interesting embodiment of the thin-film capacitor according to the invention is characterized in that the capacitor also comprises one or more floating electrode layers which do not electroconductively contact the end contacts. The advantageous effect of the breakable electrically conducting connection means between both end contacts is obtained also in this type of thin-film capacitor.

These and other aspects of the invention are apparent from and will be elucidated with reference to the embodiments described hereinafter.

Figure 2:
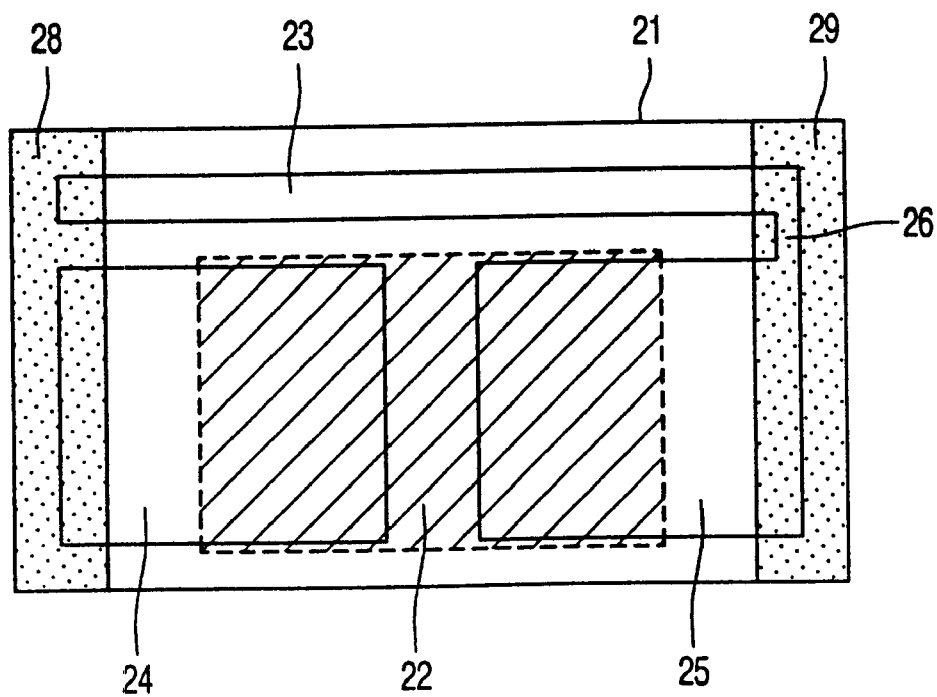

In the drawing:

FIG. 1 is a diagrammatic plan view of a first embodiment of the thin-film capacitor according to the invention, and FIG. 2 is a diagrammatic plan view of a second embodiment of the thin-film capacitor according to the invention.

It is to be noted that, for the sake of clarity, the Figures are not drawn to scale.

FIG. 1 is a diagrammatic plan view of a first embodiment of the thin-film capacitor according to the invention. This capacitor comprises an insulating substrate 1 which is preferably made of an inorganic hard material. In the present case, use is made of a substrate of glass. The dimensions of this glass substrate are 1.6 mm×0.8 mm at a thickness of 0.42 mm. Glass substrates have a relatively smooth surface. This is regarded as an important advantage in thin-film capacitors of the relevant type. It is to be noted that ceramic substrates may also be used, preferably ceramic substrates which are provided with a thin planarization layer for which notably glass is very suitable.

The substrate is provided with a first inner electrode layer 2 and a second inner electrode layer 3 of an electrically conducting material. In the relevant case, these layers are made of a layer of sputtered aluminium having a thickness of approximately 2–4 $\mu$m. The aluminium comprises several percents by weight of copper to preclude the development of so-called "hillocks". The electrode layers largely overlap each other. They are separated from each other by a layer of a dielectric material (not shown) which consists of silicon nitride in this case. This layer is provided by means of plasma-enhanced chemical vapor deposition (PE-CVD) and its thickness ranges between 0.05 and 2.5 $\mu$m.

Two opposed ends of the substrates are provided with L-shaped end contacts 6 and 7. In the example shown, these end contacts consist of a first layer of vapor-deposited Cr (layer thickness 1–100 nm) on which a second layer of vapor-deposited Cu (layer thickness 200–500 nm) is provided. In the example shown, the L-shaped end contacts consist of two parts. The first part is situated at the side of the substrate and the capacitor part. The second part extends substantially parallel to the substrate. The electric contact between the inner electrode layers and the end contacts takes place via the second part of the end contacts. The electric contact between the end contacts and the PCB takes place via the first part of the end contacts.

The capacitor is also provided with breakable electrically conducting connection means electrically connecting both end contacts. In the present example, they comprise a metal layer 4 which is provided in addition to both electrode layers 2, 3. The metal layer consists of a layer of sputtered aluminium having a layer thickness of approximately 2–4 $\mu$m. If desired, the layer may also be made from a different metal such as, for example copper.

The first and second inner electrode layers are substantially covered by an insulating overlayer (not shown). In the relevant case, it consists of a layer of silicon nitride having a thickness which ranges between 0.5 and 2.5 $\mu$m. If desired, a scratch-resistant layer of polyimide (not shown) may be provided on the overlayer. It is to be noted that the overlayer and the scratch-resistant layer preferably do not completely cover the metal layer 4. As a result, the metal layer 4 remains satisfactorily accessible for, for example, a laser treatment for interrupting the electrically conducting contact between the end contacts.

FIG. 2 is a diagrammatic plan view of a second embodiment of the thin-film capacitor according to the invention. This capacitor comprises an insulating substrate 21, preferably of an inorganic hard material. In the relevant case, a substrate of glass is used again. Its dimensions were 0.8 mm×1.6 mm at a thickness of 0.42 mm.

A main surface of the substrate 21 is provided with a so-called floating electrode layer 22 of an electrically conducting material. In the embodiment shown, this is a layer of sputtered aluminium (comprising 4% by weight of copper) having a thickness ranging between 2 and 4 $\mu$m. The floating electrode layer 22 is provided with a layer of a dielectric material (not shown) which, in this case, mainly consists of silicon nitride. This layer is provided by means of a deposition technique, here PE-CVD. Its thickness ranges between 0.3 and 2.5 $\mu$m. Electrode layer 22 does not make any electrically conducting contact with one of the two end contacts.

Two other inner electrode layers 24 and 25 are provided on said dielectric layer. These inner electrodes also consist of aluminium comprising 4% by weight of copper. The thickness of the layers ranges between 2 and 4 $\mu$m. The capacitor shown is also provided with breakable electrically conducting connection means which are provided in the form of a metal layer 23 in this case. This layer is of the same material and has the same thickness as electrode layers 24 and 25. In this case, metal layer 23 is directly connected to the inner electrode layer 25 via an intermediate piece 26. The inner electrode layers 24 and 25 and the metal layer 23 are provided on said dielectric layer in a single process step.

Both electrode layers 24 and 25 are largely covered with an overlayer (not shown) which consists of a layer of silicon nitride in the present case. Its thickness ranges between 0.5 and 2.5 $\mu$m. This layer is also provided with a scratch-resistant layer of polyimide (not shown) whose layer thickness ranges between 5 and 30 $\mu$m. It is to be noted that the overlayer and the scratch-resistant layer preferably do not entirely cover the metal layer 23. As a result, the metal layer 23 remains satisfactorily accessible for, for example a laser treatment for interrupting the electrically conducting contact between the end contacts.

Two U-shaped end contacts 28 and 29 are provided at two opposed ends of the substrate. In this example, these end contacts consist of a first layer of vapor-deposited Cr (layer thickness 1–100 nm) on which a second layer of Cu (layer thickness 200–500 nm) is vapor deposited. Both inner electrode layers 25 and 26 electrically contact, at one end, one of the two end contacts 28 and 29. The breakable electrically conducting connection means in the form of metal layer 23 electroconductively contacts both end contacts 28 and 29 via the two ends of the metal layer 23.

Both described embodiments of the capacitor according to the invention can be mass-produced in the following manner. For the starting material, use is made of, for example, a 4" (square) or a 6" (round) wafer of glass having a thickness of 0.42 mm. After cleaning (ultrasonic treatment carried out successively in a solution of soap and an acid solution) this wafer is provided, on a first main surface, with a pattern of (inner or floating) electrode layers of substantially aluminium by means of sputter deposition and lithography. This pattern of electrode layers is subsequently provided with a dielectric layer in the form of a closed thin layer of silicon nitride by means of plasma-enhanced CVD. A pattern of inner electrodes is provided on the dielectric layer by means of sputter deposition and lithography.

Subsequently, a second closed layer of silicon nitride is provided on this pattern of electrode layers. If desired, the second layer of silicon nitride is provided with a patterned layer of polyimide as a scratch-resistant layer. The patterning of the last-mentioned layer is chosen to be such that no polyimide is provided at the location of the ends of the inner electrode layers which must be connected to the end contacts. Subsequently, the uncoated silicon nitride is removed by means of reactive ion etching (RIB) or by means of plasma etching so that the underlying ends of the inner electrodes are exposed.

Subsequently, a part of the end contacts is provided in patterns by successively sputtering or vapor-depositing Cr and Cu. This part of the end contacts makes direct contact with the exposed ends of the inner electrode layers. If U-shaped contacts are desired, the second main surface of the substrate is provided, in the same way in patterns, with a part of the end contacts. These are then directly provided on the glass or on the layer of polymer material which is present.

The breakable electrically conducting connection means, preferably in the form of a metal layer, may be provided on the capacitor at different moments. It is possible to do this simultaneously when providing the floating electrode layers or simultaneously when providing the inner electrode layers. It is important that, after their provision, the electrically conducting connection means are no longer entirely covered by another layer such as a dielectric layer, an overlayer or a scratch-resistant layer. Due to this measure, the connection means remain externally accessible, for example, for a laser treatment.

After all of said layers have been provided, the wafers are separated into strips (by means of, for example, sawing). The separation planes of the strips are provided with an electrically conducting material (for example, vapor-deposited or sputtered Cu and Cr), whereby the complete end contacts are formed. If desired, the end contacts are strengthened by means of galvanic processes, with a successive growth of a layer of Cu (approximately 2 $\mu$m), Ni (approximately 1 $\mu$m) and Sn (approximately 5 $\mu$m) on the end contacts. Finally the strips are separated (for example, by sawing) to form the individual thin-film capacitors. It is to be noted that, if desired, the galvanic strengthening of the end contacts may also take place on the individual thin-film capacitors.

In accordance with a further embodiment, a thin-film capacitor of the type 0805 as shown in FIG. 1 was manufactured, which capacitor had a capacitance of 63.3 nF and a loss factor tan(d) of 0.01. By means of sputtering, a metal layer of Ag was provided, which functioned as electrically conducting connection means between the end contacts. The measured electric resistance of the metal layer was 0.7 Ohm. Subsequently, the capacitor was kept in a Pb/Sn bath at 260° C. for several minutes, approximating the conditions of wave soldering. The layer of Ag appeared to dissolve completely so that the ESD protection was eliminated. After the experiment had been finished, the capacitor appeared to have a capacitance of 64.5 nF.

In accordance with a further embodiment of the invention, a thin-film capacitor of the type 0805 as shown in FIG. 1 was manufactured. By means of sputtering, a 100 nm thick layer of the metal alloy $Pb_{0.38}Sn_{0.62}$ was provided, which functioned as electrically conducting connection means between the end contacts. The capacitor thus manufactured was placed on a PCB provided with soldering paste and subjected to a reflow soldering treatment at approximately 250° C. The provided layer of $Pb_{0.38}Sn_{0.62}$ melted at approximately 183° C. Due to the high surface tension of the molten metal alloy, the molten material was drawn into the direction of the end contacts. Consequently, the direct electrically conducting connection between both end contacts was interrupted so that the ESD protection was eliminated.

In yet another embodiment of the invention, a thin-film capacitor of the type 0805 as shown in FIG. 1 was manufactured. By means of sputtering, a 100 nm thick layer of the electrically conducting metal compound TaN was provided, which functioned as electrically conducting connection means between the end contacts. Subsequently, the capacitor thus manufactured was soldered on the contact faces of a PCB via the end contacts. Then, the layer was locally heated by means of a laser. Under the influence of this heat treatment, the electrically conducting metal compound TaN was converted into the electrically non-conducting metal compound $Ta_2O_5$. As a result, the direct electrically conducting connection between both end contacts was interrupted so that the ESD protection was eliminated.

It is to be noted that the invention has been described with reference to discrete thin-film capacitors. It should be emphasized that the invention may also be used in capacitors which are integrated in networks of capacitors and/or other passive components. However, since the breakdown problem owing to accumulation of electric charge is greatest in discrete thin-film capacitors, the effect of the invention will be most prominent in the last-mentioned type of capacitors.

The present invention provides a novel type of thin-film capacitor which is insensitive to breakdown voltages when they are mounted on a printed circuit board. It comprises an insulating substrate which is provided with at least two inner electrode layers which are separated from each other by means of a dielectric layer. The substrate is also provided with two end contacts each being in electroconductive contact with one of the two inner electrode layers. According to the invention, the capacitor also comprises breakable electrically conducting connection means, preferably in the form of a metal layer, which connect both end contacts electrically. The presence of breakable electrically conducting connection means between the end contacts prevents damage to the capacitor as a result of electric charge when the capacitor is being mounted on a printed circuit board. By using the construction according to the invention, such a charge is directly neutralized via the electrically conducting connection means. After fixation of the capacitor to the printed circuit board, the electrically conducting connection means can be removed, for example, by means of a laser treatment or by applying a controlled burst of current. This interrupts the electrically conducting contact between the end contacts.

What is claimed is:

1. A thin-film capacitor comprising an insulating substrate which is provided with at least two inner electrode layers which are separated from each other by means of a dielectric layer, the substrate being also provided with two end contacts each electroconductively contacting one of the two inner electrode layers, characterized in that the capacitor is also provided with breakable electrically conducting connection means which connect both end contacts electrically.

2. A thin-film capacitor as claimed in claim 1, characterized in that the breakable electrically conducting connection means comprise a metal layer.

3. A thin-film capacitor as claimed in claim 2, characterized in that the metal layer forms part of an electrode layer.

4. A thin-film capacitor as claimed in claim 3, characterized in that the metal layer consists substantially of aluminium.

5. A thin-film capacitor as claimed in claim 2, characterized in that the metal layer consists substantially of a metal which dissolves in solder.

6. A thin-film capacitor as claimed in claim 1, characterized in that the electrically conducting connection means comprise a layer of a low melting point metal alloy having a high surface tension.

7. A thin-film capacitor as claimed in claim 1, characterized in that the capacitor also comprises one or more floating electrode layers which do not electroconductively contact the end contacts.

8. A thin-film capacitor as claimed in claim 1, characterized in that the electrically conducting connection means comprises a layer of an electrically conductive metallic compound which, when heated, is converted to a nonconducting metal oxide.

* * * * *